(12) United States Patent
Ho et al.

(10) Patent No.: US 8,060,028 B1
(45) Date of Patent: Nov. 15, 2011

(54) MULTI-SPECTRUM HIGH DATA RATE COMMUNICATIONS SYSTEM WITH ELECTROMAGNETIC INTERFERENCE CANCELLATION

(75) Inventors: Thinh Q. Ho, San Diego, CA (US); Will Henry, San Diego, CA (US); Stephen M. Hart, Fogelsville, PA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 455 days.

(21) Appl. No.: 12/437,200

(22) Filed: May 7, 2009

(51) Int. Cl.
*H04B 1/44* (2006.01)
(52) U.S. Cl. .......................... 455/78; 455/296
(58) Field of Classification Search .................. None
See application file for complete search history.

(56) References Cited

U.S. PATENT DOCUMENTS

| | | | |
|---|---|---|---|
| 6,163,395 A | 12/2000 | Nemecek et al. | |
| 6,181,286 B1 | 1/2001 | Roscoe et al. | |
| 6,211,671 B1 | 4/2001 | Shattil | |
| 6,275,196 B1 | 8/2001 | Bobier | |
| 6,907,093 B2 * | 6/2005 | Blount et al. | 375/346 |
| 6,992,641 B1 | 1/2006 | Sanelli | |
| 7,084,823 B2 | 8/2006 | Caimi et al. | |
| 7,424,274 B2 | 9/2008 | Morris et al. | |
| 7,454,184 B2 * | 11/2008 | Ismail | 455/296 |
| 8,014,745 B1 * | 9/2011 | Ho et al. | 455/278.1 |
| 2004/0227683 A1 | 11/2004 | Caimi et al. | |
| 2006/0270368 A1 | 11/2006 | Caimi et al. | |
| 2007/0096919 A1 | 5/2007 | Knadle, Jr. et al. | |
| 2007/0117514 A1 | 5/2007 | Gainey et al. | |

* cited by examiner

*Primary Examiner* — Cassandra Cox
(74) *Attorney, Agent, or Firm* — Ryan J. Friedl; Kyle Eppele

(57) ABSTRACT

A system may include one or more transmitter processing modules each having at least one of a plurality of modulation elements arranged in parallel. Each modulation element may be configured to modulate a respective baseband data signal at a different rate than other modulation elements. The system may include one or more receiver processing modules each having a plurality of demodulation elements arranged in parallel. Each demodulation element may be configured to demodulate a respective baseband data signal at a different rate than other demodulation elements. The system may include a first antenna for transmitting signals and a second antenna for receiving signals. One or more isolation systems may be used to actively cancel electromagnetic interference received by the receiving antenna from the transmitting antenna.

14 Claims, 5 Drawing Sheets

MULTI-SPECTRUM HIGH DATA RATE COMMUNICATIONS SYSTEM WITH ELECTROMAGNETIC INTERFERENCE CANCELLATION

FEDERALLY SPONSORED RESEARCH AND DEVELOPMENT

The Multi-Spectrum High Data Rate Communications System with Electromagnetic Interference Cancellation is assigned to the United States Government and is available for licensing for commercial purposes. Licensing and technical inquiries may be directed to the Office of Research and Technical Applications, Space and Naval Warfare Systems Center, Pacific, Code 2112, San Diego, Calif., 92152; voice (619) 553-2778; email T2@spawar.navy.mil. Reference Navy Case No. 79848.

BACKGROUND

A conventional approach for achieving multiple communications functions is to use different set(s) of signal processors, such as modulators/demodulators, for each communication rate. In this configuration, a single processing chain is required for transmitting and another processing chain is used for receiving. Unfortunately, this conventional concept breaks down when the system operates at various speeds without changing the actual processors. There are currently no practical single system architectures that may operate at varying frequencies, while combining different coding spectrums. New approaches for variable rate communications are desirable.

DETAILED DESCRIPTION OF SOME EMBODIMENTS

Embodiments of the Multi-Spectrum High Data Rate Communications System with Electromagnetic Interference Cancellation may utilize various high speed modulators and demodulators, IF chains, selectable switches, and isolation networks to realize simultaneous operations in a mixed mode multiple carrier environment. Modulators and demodulators can be implemented in a parallel processing configuration along with bandwidth tolerated IF blocks to allow different spectrums to be processed. Data rates can be varied from speed of less than T1 telephony to the Giga-bit range. Multiplexing method can be inserted to allow possible mixed coding communications.

The systems discussed herein enable communications systems to be consolidated into a single aperture. In particular, the systems allow multiple coding spectrums for multifunctional systems to be consolidated into a single aperture. This concept allows parallel signal processing to be performed in a real time environment. Additionally, the systems allow various communications functions to be consolidated under a single system housing. As a result, a plurality of antennas can be consolidated into a single structure such that LO characteristics can be achieved. Variable speed modulators and demodulators may also be inserted into the system architecture to create a real-time multifunctional communications system without changing existing hardware, and/or overall weight, space, and cost can be significantly reduced with new systems based on the concepts below.

Figure 1:
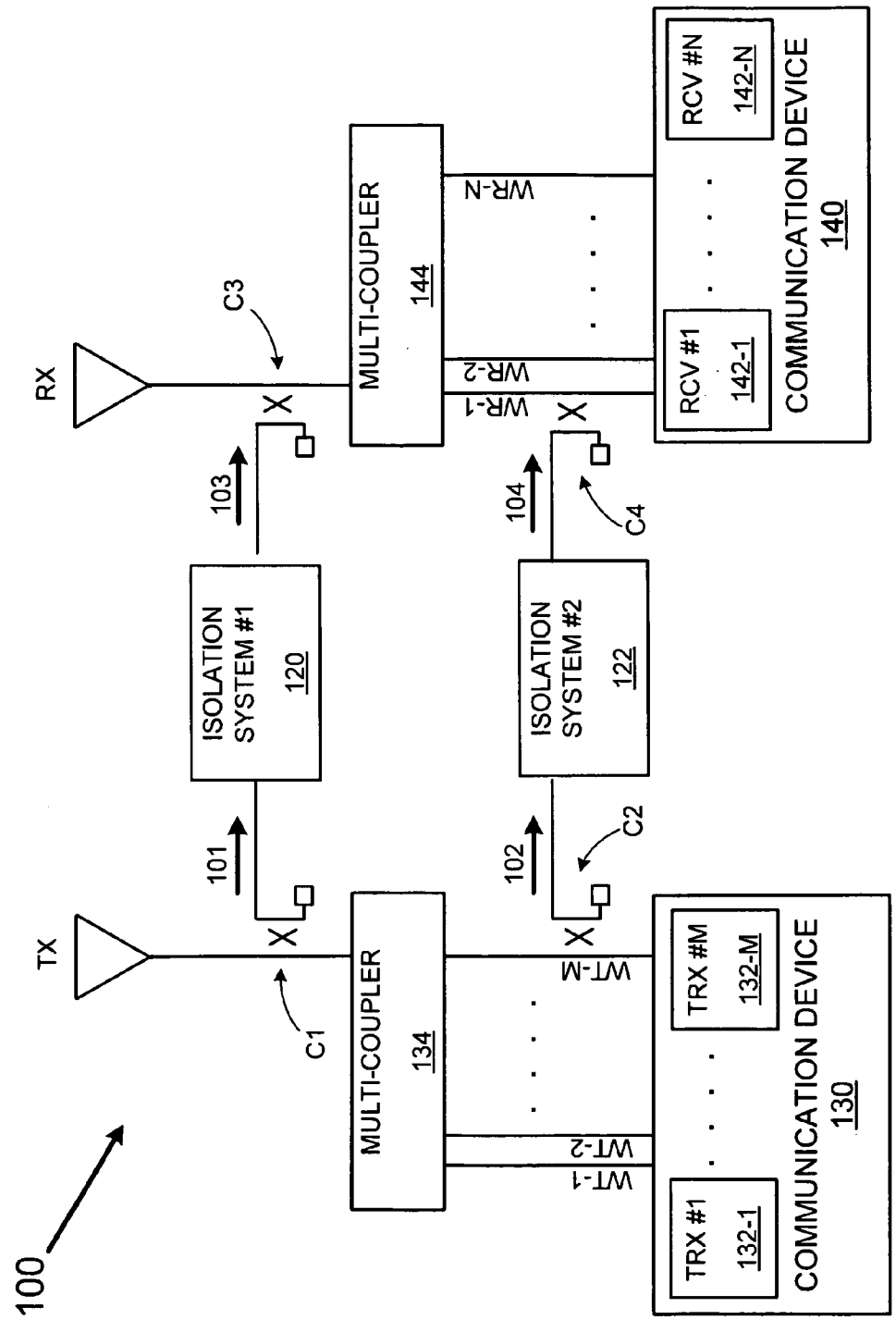
FIG. 1 shows a block diagram of an embodiment of a communication system in accordance with the Multi-Spectrum High Data Rate Communications System with Electromagnetic Interference Cancellation.

FIG. 1 shows a block diagram of an embodiment of a communication system 100 in accordance with the Multi-Spectrum High Data Rate Communications System with Electromagnetic Interference Cancellation. System 100 may include a first isolation system 120 and a second isolation system 122. System 100 may include a first communication device 130 having a plurality of transmitter processing modules 132-1 . . . 132-M each coupled to transmit antenna TX via multi-coupler 134. System 100 may also include a second communication device 140 having a plurality of receiver processing modules 142-1 . . . 142-N each coupled to receive antenna RX via multi-coupler 144.

The first isolation system 120 is coupled from the transmit antenna TX via coupler C1, and coupled to the receive antenna RX via coupler C3. Similarly, the second isolation system 122 is coupled from individual wires WT-1 . . . WT-M between multi-coupler 134 via coupler C2, and further coupled to individual wires WR-1 . . . WR-N between multi-coupler 144 via coupler C4. Either or both of couplers C2 and C4 may comprise multiple individual couplers in various embodiments and isolation system 122 may include a separate set of circuitry for various wires and couplers. For example, if a separate coupler for each transmit wire WT-1 . . . WT-M is used, isolation system 122 may include M separate devices with each device having N outputs.

Communication devices 130 and 140 may operate independently or interdependently, and may be located such that there may be electromagnetic interference between the two systems. For example, receive antenna RX may be in appreciable proximity of the transmit antenna TX such that receiver antenna RX receives substantial electromagnetic interference from the first communication device 130.

To compensate for undesirable electromagnetic cross-coupling, the isolation system 120 and/or the isolation system 122 may be employed to actively cancel such interference. For example, using coupler C1, the isolation system 120 may receive coupled signal 101 from transmitter antenna TX-1, then apply an appropriate phase and amplitude adjustment to produce compensation signal 103, which may be coupled into receiver antenna RX-2 via coupler C3. If the amplitude and phase are appropriately adjusted, the electromagnetic interference at receiver antenna RX-2 from transmitter antenna TX-1 may be minimized.

Similarly, using coupler C2, isolation system 122 may receive signal 102 from devices TX-1 . . . TX-M, then apply an appropriate phase and amplitude adjustment to produce signal 104, which may be coupled into devices RX-1 . . . RX-N via coupler C4. If the amplitude and phase are appropriately adjusted, the electromagnetic interference at receive antenna RX due to transmit antenna TX may be minimized.

Figure 2:
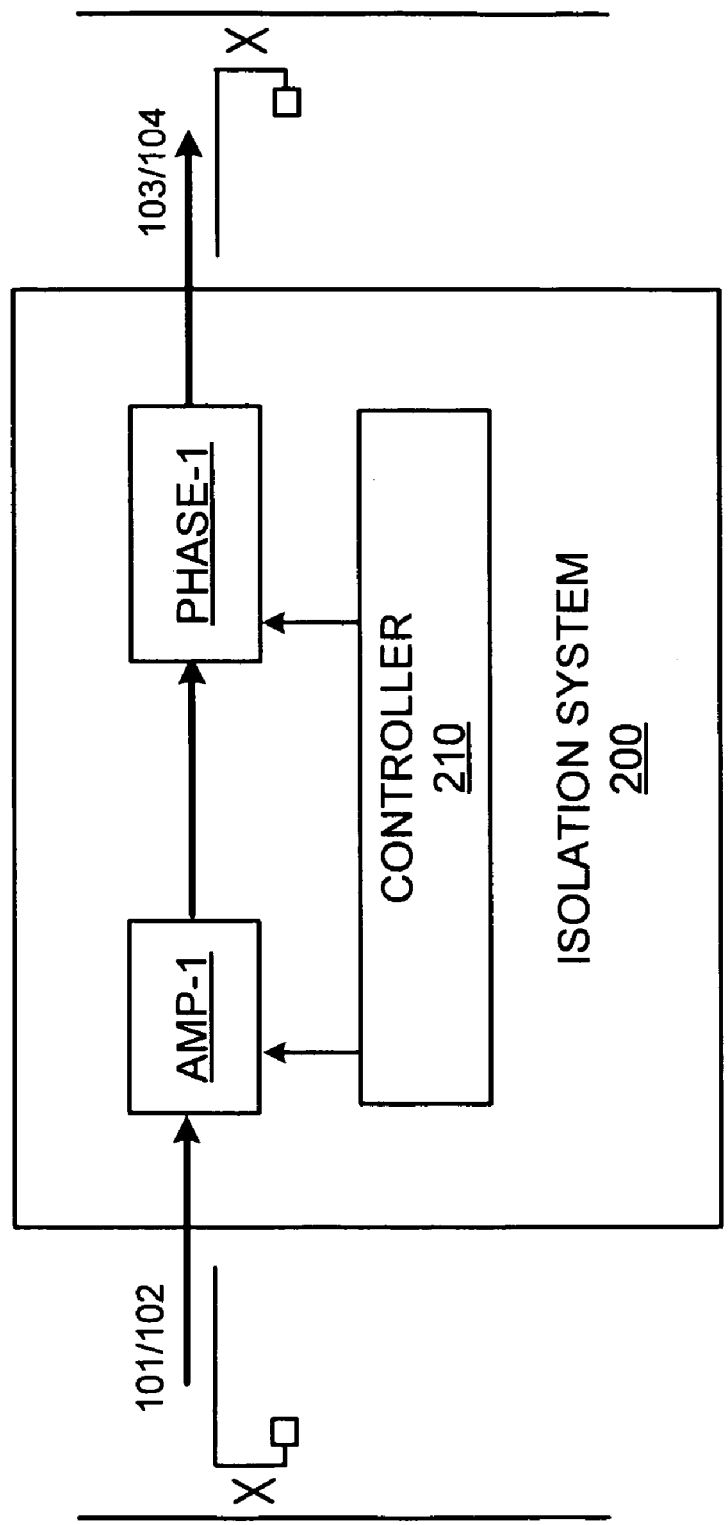
FIG. 2 shows a block diagram of an embodiment of an isolation system for use with a communication system in accordance with the Multi-Spectrum High Data Rate Communications System with Electromagnetic Interference Cancellation.

FIG. 2 shows a block diagram of an embodiment of an isolation system 200 for use with a communication system such as system 100. System 200 may include a controller 210, a first amplifier device AMP-1 and a first phase adjustment device (or phase delay device) PHASE-1 for appropriately processing signal 101 to produce signal 103. In some embodiments, isolation system 120 may also include a second amplifier device AMP-2 (not shown) and a second phase adjustment device (or phase delay device) PHASE-2 (not shown) for processing coupled signal 102 to produce compensation signal 104. In the present example, devices AMP-1 and PHASE-1 may be controlled by controller 210, which may use any number of known or later developed adaptive signal processing techniques, such as a steepest descent algorithm or a specially designed adaptive neural network, to adapt signals 103 and 104 such that they may appropriately cancel undesired electromagnetic interference at the appropriate receiver antennas.

Figure 3:
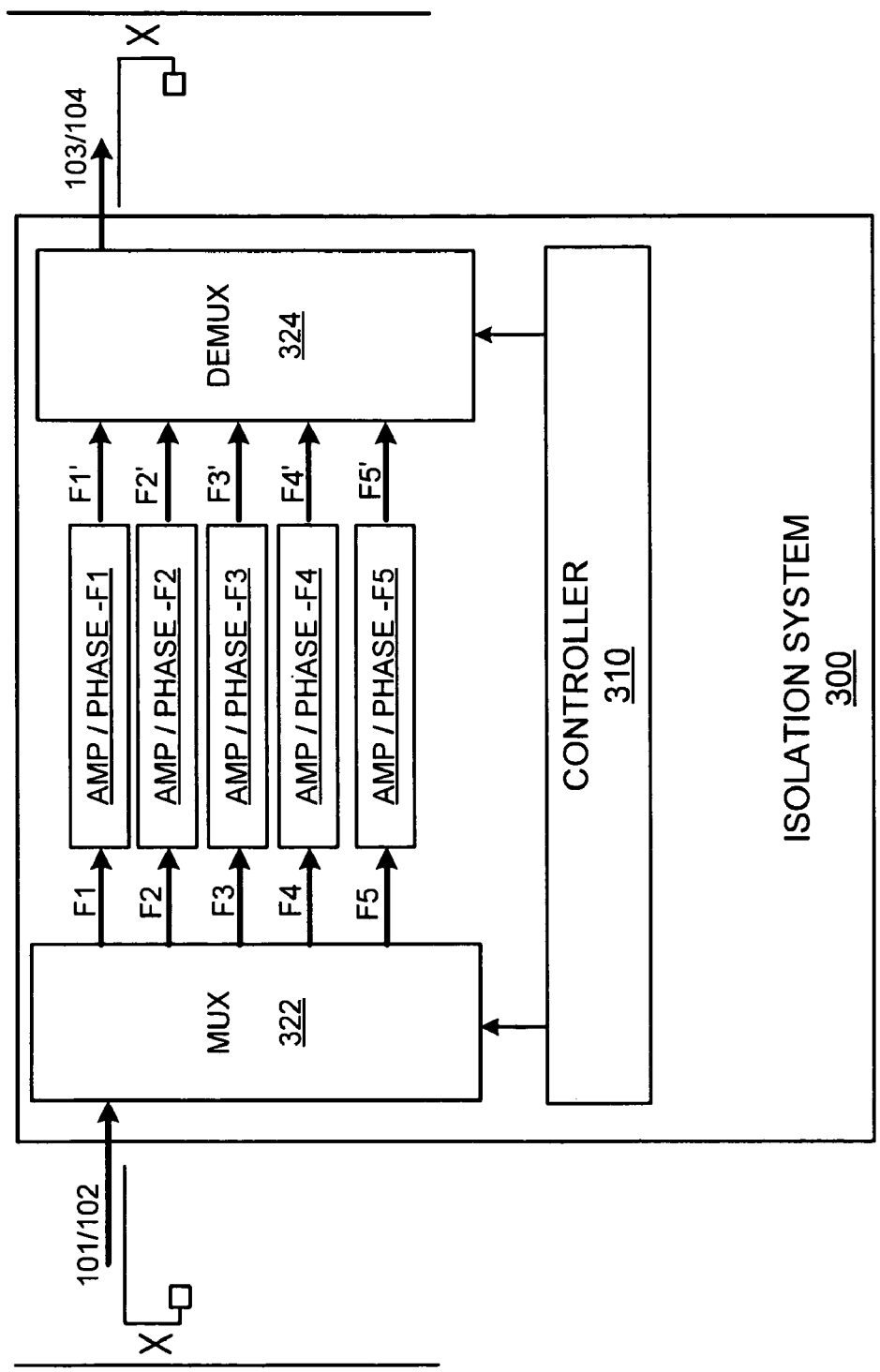
FIG. 3 shows a block diagram of another embodiment of an isolation system for use with a communication system in accordance with the Multi-Spectrum High Data Rate Communications System with Electromagnetic Interference Cancellation.

FIG. 3 shows a block diagram of another embodiment of an isolation system 300 for use with a communication system such as system 100. Isolation system 300 may include a controller 310, a multiplexer 322 for dividing a transmitted signal into a plurality of multiplexed signals having separate frequency sub-ranges, such as sub-ranges F1 . . . F5, a plurality of compensation devices, such as AMP/PHASE F1 . . . AMP/PHASE F5, coupled from the multiplexer 322 for producing separate compensated signals, such as signals F1' . . . F5', and a frequency de-multiplexer 324 for de-multiplexing/combining compensated signals, such as compensated signals F1' . . . F5', into a single output signal. While FIG. 3 shows an embodiment of system 300 employing five separate sub-ranges, other embodiments of system 300 may be adapted to any number of separate frequency components. In some embodiments, the compensation devices comprise amplifier circuits and phase adjustment circuits.

Depending upon the particular circumstances, it may be difficult to form a compensated signal from a transmitted signal having a broad frequency spectrum, especially given that "free-air" coupling between a transmitter and a closely located receiver may be highly frequency dependent. In such cases, the configuration of isolation system 300 may be useful to produce a single compensated signal by allowing the separate compensation devices AMP/PHASE F1 . . . AMP/PHASE F5 to separately process the different frequency ranges F1 . . . F5 as may be appropriate. Further, in various embodiments, isolation system 200 and isolation system 300 may have multiple inputs (e.g., a summed input from multiple transmission sources) and/or outputs (e.g., a series of repeated outputs of the same processed/compensated signals).

Figure 4:
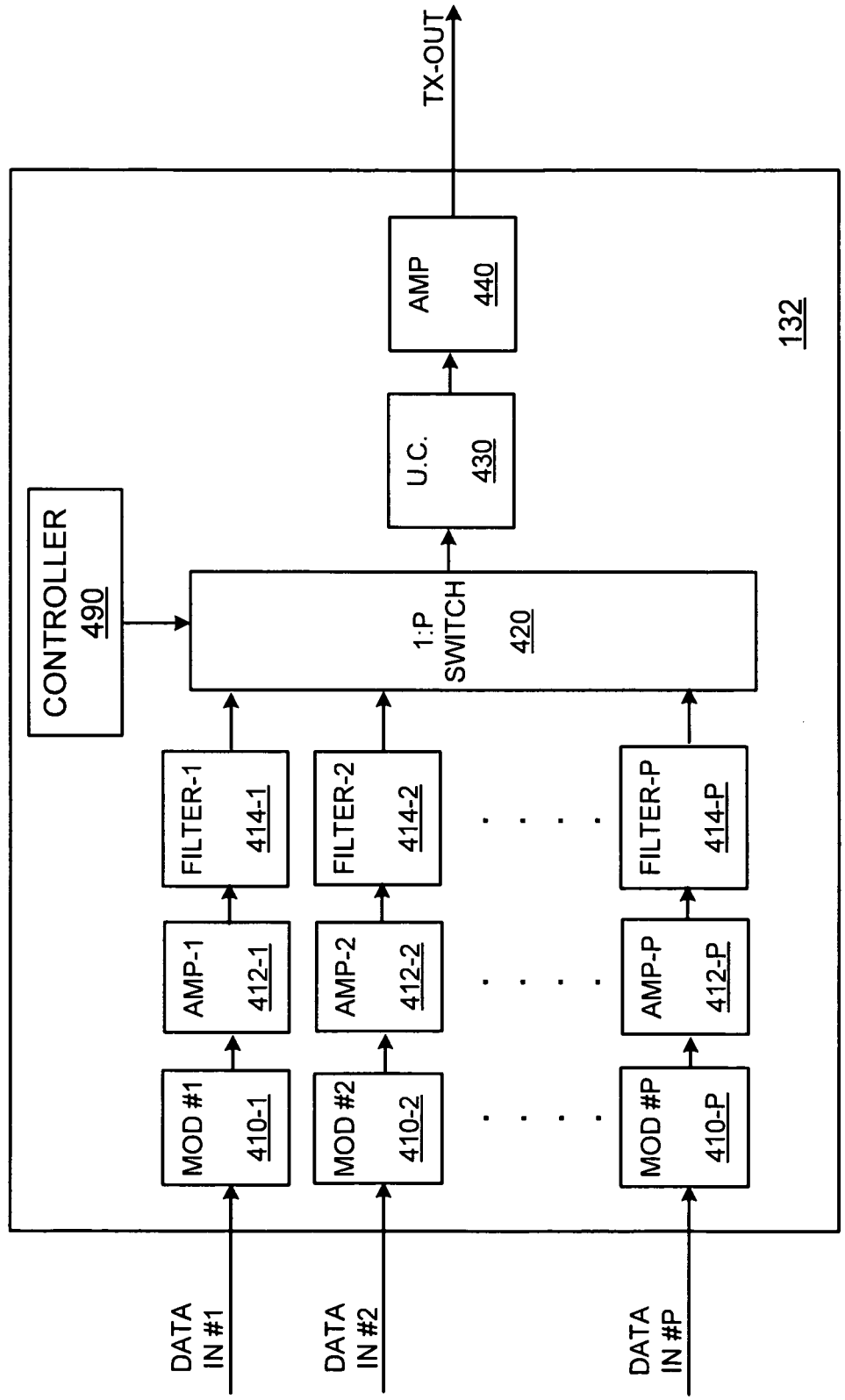
FIG. 4 shows a block diagram of an embodiment of a transmitter processing module for use with a communication system in accordance with the Multi-Spectrum High Data Rate Communications System with Electromagnetic Interference Cancellation.

FIG. 4 shows a block diagram of an embodiment of a transmitter processing module 132 for use with a communication system such as system 100. Transmitter processing module 132, such as any of the transmitter processing modules 132-1 . . . 132-M of FIG. 1, may include a number of modulators 410-1 . . . 410-P, each configured to receive a separate respective input signal, modulate such respective input signal, and provide a modulated signal to a respective series amplifier 412-1 . . . 412-P and filter 414-1 . . . 414-P to produce P number of available modulated baseband signals. Each modulated baseband signal may be similar, or may have a different data and/or modulation type/rate than the other modulated signals.

Each modulated baseband signal can then be provided to switch 420, which is a 1:P switch configured to couple each modulated signal one at a time to frequency up-converter 430 and amplifier 440. The up-converted and amplified signal selected by switch 420 may be output to a transmit antenna via a coupler, such as the multi-coupler 134 of FIG. 1.

Figure 5:
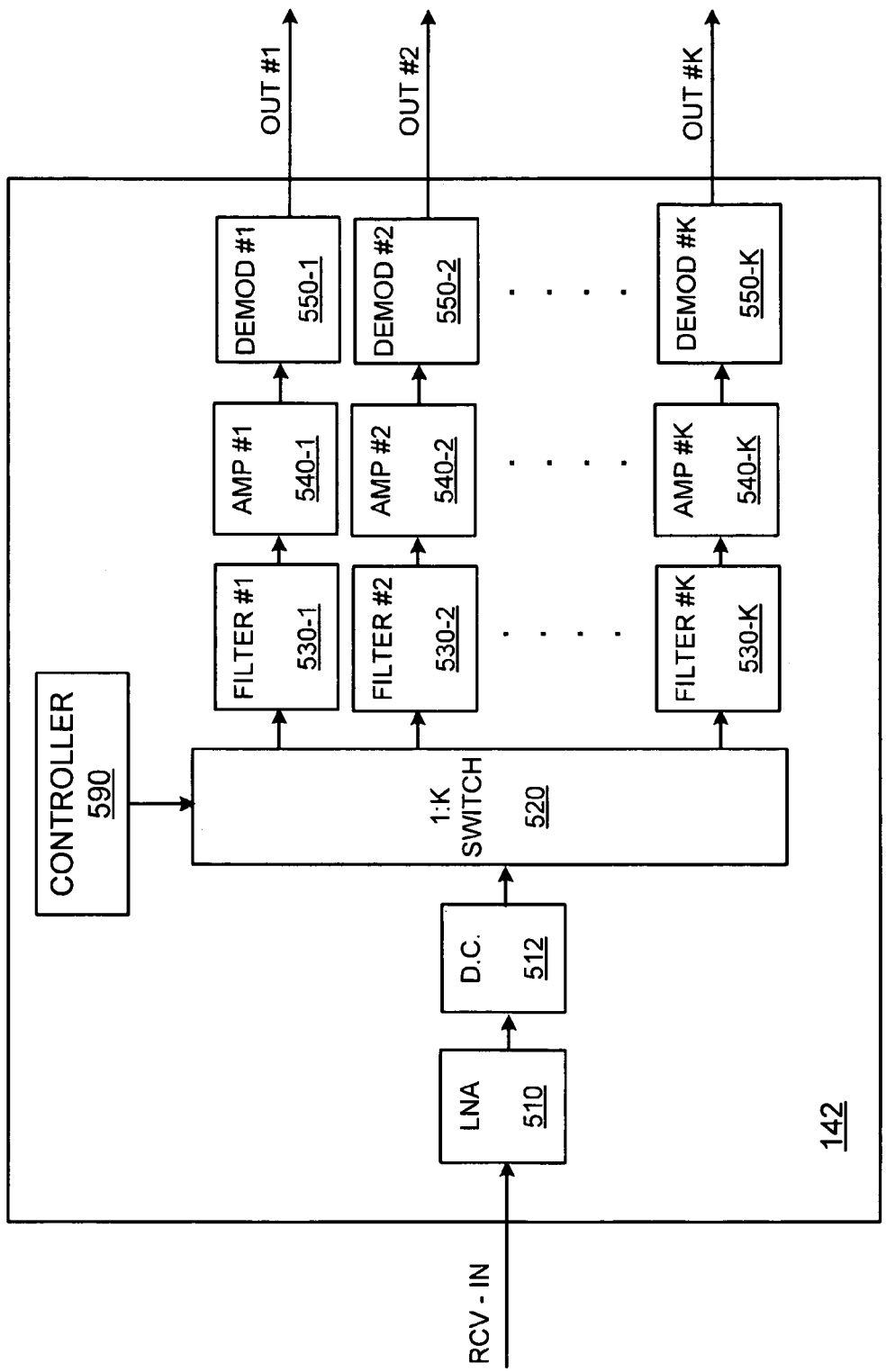
FIG. 5 shows a block diagram of an embodiment of a receiver processing module for use with a communication system in accordance with the Multi-Spectrum High Data Rate Communications System with Electromagnetic Interference Cancellation.

FIG. 5 shows a block diagram of an embodiment of a receiver processing module 142 for use with a communication system such as system 100. Receiver processing module 142, such as any of the receiver processing modules 142-1 . . . 142-N of FIG. 1, may include an input amplifier/buffer 510, a frequency down-converter 512, a 1:K switch, a plurality of demodulation elements arranged in parallel, with each such demodulating element including a filter 530-1 . . . 530-K, an amplifier 540-1 . . . 540-K and a demodulator 550-1 . . . 550-K.

A received RF signal may be received by amplifier 510 and down-converter 512 to produced a down-converted (i.e., baseband) signal. The down-converted signal may be output to one or more modulation element filters 530-1 . . . 530-K, amplifiers 540-1 . . . 540-K and demodulators 550-1 . . . 550-K to produce a baseband data signal having data provided at any of the available rates and/or modulation schemes of the demodulators 550-1 . . . 550-K.

Many modifications and variations of the Multi-Spectrum High Data Rate Communications System with Electromagnetic Interference Cancellation are possible in light of the above description. Within the scope of the appended claims, the Multi-Spectrum High Data Rate Communications System with Electromagnetic Interference Cancellation may be practiced otherwise than as specifically described. The scope of the claims is not limited to the implementations and embodiments disclosed herein, but extends to other implementations and embodiments as may be contemplated by those having ordinary skill in the art.

We claim:

1. A system comprising:
    at least two transmitter processing modules each comprising:
        a plurality of modulation elements arranged in parallel, each modulation element configured to modulate a respective baseband data signal at a different rate than the other modulation elements,
        a plurality of first amplifiers, each first amplifier operatively connected to one of the modulation elements,
        a plurality of filters, each filter operatively connected to one of the first amplifiers,
        a switch operatively connected to each of the plurality of filters,
        a frequency up-converter operatively connected to the switch, and
        a second amplifier operatively connected to the frequency up-converter.

2. The system of claim 1 further comprising:
    at least two receiver processing modules, operatively connected to the transmitter processing modules, comprising:
        a first amplifier;
        a frequency down-converter operatively connected to the first amplifier,
        a switch operatively connected to the frequency down-converter,
        a plurality of filters, arranged in parallel, operatively connected to the switch, a plurality of second amplifiers, each second amplifier operatively connected to one of the filters, a plurality of demodulation elements, each demodulation element operatively connected to one of the second amplifiers, each demodulation element configured to demodulate a respective baseband data signal at a different rate than the other demodulation elements.

3. The system of claim 2 further comprising:
a first coupler connected to each of the transmitter processing modules;
a first antenna connected to the first coupler;
a second coupler connected to each of the receiver processing modules; and
a second antenna connected to the second coupler.

4. The system of claim 3 further comprising at least one isolation system configured to adaptively cancel electromagnetic interference between the first and second antennas, the isolation system directly coupled to at least one of the first and second antennas.

5. The system of claim 4, wherein the isolation system is directly coupled to both the first and second antennas.

6. The system of claim 4, wherein the isolation system comprises:
a controller;
an amplifier circuit connected to the controller; and
a phase adjustment circuit connected to the controller and the amplifier circuit.

7. The system of claim 4, wherein the isolation system comprises:
a controller;
a multiplexer, operatively connected to the controller, configured to divide a signal into a plurality of multiplexed signals having separate frequency sub-ranges;
a plurality of compensation devices, operatively connected to the multiplexer, each configured to input one of the multiplexed signals and output a compensated signal, the number of compensation devices equal to the number of separate frequency sub-ranges;
a demultiplexer, operatively connected the controller and the plurality of compensation devices, configured to combine the compensated signals into an output signal.

8. The system of claim 7, wherein the compensation devices comprise amplifier circuits and phase adjustment circuits.

9. The system of claim 2, wherein the transmitter processing modules and the receiver processing modules operate between the frequency range of about 2 MHz and about 100 GHz.

10. A communication system comprising:
a transmitter system comprising:
a plurality of transmitter processing modules each including a plurality of modulation elements arranged in parallel, each modulation element configured to modulate a respective baseband data signal at a different rate than other modulation elements,
a 1:P switch configured to couple an output of each of the plurality of modulation elements one at a time to an input of a transmitter coupling system so as to couple a single modulator to a transmit antenna, where P is an integer greater than 1; and
a receiver system, operatively connected to the transmitter system, comprising:
a plurality of receiver processing modules each including a plurality of demodulation elements arranged in parallel, each demodulation element configured to demodulate a respective baseband data signal at a different rate than other demodulation elements, and
a 1:K switch configured to couple an input of each of the plurality of demodulation elements one at a time to an output of the coupling system so as to couple a single demodulator to a receive antenna, where K is an integer greater than 1.

11. The system of claim 10, further comprising an isolation system configured to adaptively cancel electromagnetic interference generated by the transmitter system at the receiver system, the isolation system directly coupled to at least one of the transmit antenna and the receive antenna.

12. The system of claim 11, wherein the isolation system is directly coupled to a first electrical node electrically located between an output of a switch for a transmitter processing module and the transmitter coupling system.

13. The system of claim 11, wherein the isolation system is directly coupled to a first electrical node electrically located between an input of a switch for a receiver processing module and the receiver coupling system.

14. The system of claim 10, wherein the transmitter system processing modules are arranged in parallel.

* * * * *